United States Patent
Wishne

(10) Patent No.: US 10,360,747 B2
(45) Date of Patent: Jul. 23, 2019

(54) ELECTRONIC ACCESS CONTROL SYSTEM

(71) Applicant: CAPITAL ONE SERVICES, LLC, McLean, VA (US)

(72) Inventor: Justin Wishne, Chicago, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 15/945,840

(22) Filed: Apr. 5, 2018

(65) Prior Publication Data

US 2018/0225900 A1    Aug. 9, 2018

Related U.S. Application Data

(63) Continuation of application No. 15/371,821, filed on Dec. 7, 2016, now Pat. No. 9,965,911.

(60) Provisional application No. 62/263,801, filed on Dec. 7, 2015.

(51) Int. Cl.
*G07C 9/00* (2006.01)
*H04W 12/04* (2009.01)

(52) U.S. Cl.
CPC ..... *G07C 9/00309* (2013.01); *G07C 9/00571* (2013.01); *G07C 9/00904* (2013.01); *G07C 2009/00404* (2013.01); *G07C 2009/00436* (2013.01); *G07C 2009/00793* (2013.01); *H04W 12/04* (2013.01)

(58) Field of Classification Search
CPC ............ G07C 9/00309; G07C 9/00904; G07C 9/00571
USPC ..................................................... 340/5.61
See application file for complete search history.

(56) References Cited

U.S. PATENT DOCUMENTS

| 6,572,015 B1* | 6/2003 | Norton .................... B60R 25/02 235/375 |
| 7,784,687 B2 | 8/2010 | Mullen et al. |
| 7,793,851 B2 | 9/2010 | Mullen |
| 7,828,220 B2 | 11/2010 | Mullen |
| 7,931,195 B2 | 4/2011 | Mullen |
| 7,954,705 B2 | 6/2011 | Mullen |

(Continued)

OTHER PUBLICATIONS

International Search Report and Written Opinion from related PCT/US16/65373, dated Apr. 27, 2017, 16 pages.

(Continued)

*Primary Examiner* — Vernal U Brown
(74) *Attorney, Agent, or Firm* — Troutman Sanders LLP; Christopher J. Forstner; John A. Morrissett

(57) ABSTRACT

A system includes one or more memory devices storing instructions, and one or more processors configured to execute the instructions to perform steps of a method. The system may receive an authentication request from a computing device and determine whether the authentication request corresponds with stored authentication data. Based on the determination, the system may store identification data associated with a smart device corresponding to the authentication request. The system may receive detection data when the smart device is detected within a predetermined area and, in response to a detection, obtain an identifier from the smart device. The system may determine whether the obtained identifier corresponds with the stored identification data. Based on the determination, the system may direct an electronic lock to transition from a locked state to an unlocked state.

14 Claims, 10 Drawing Sheets

(56) References Cited

U.S. PATENT DOCUMENTS

| | | |
|---|---|---|
| D643,063 S | 8/2011 | Mullen et al. |
| 8,011,577 B2 | 9/2011 | Mullen et al. |
| 8,020,775 B2 | 9/2011 | Mullen et al. |
| 8,066,191 B1 | 11/2011 | Cloutier et al. |
| D651,237 S | 12/2011 | Mullen et al. |
| D651,238 S | 12/2011 | Mullen et al. |
| 8,074,877 B2 | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| 8,172,148 B1 | 5/2012 | Cloutier et al. |
| D665,022 S | 8/2012 | Mullen et al. |
| D665,447 S | 8/2012 | Mullen et al. |
| D666,241 S | 8/2012 | Mullen et al. |
| 8,282,007 B1 | 10/2012 | Cloutier et al. |
| 8,286,876 B2 | 10/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| 8,348,172 B1 | 1/2013 | Cloutier et al. |
| D676,487 S | 2/2013 | Mullen et al. |
| D676,904 S | 2/2013 | Mullen et al. |
| 8,382,000 B2 | 2/2013 | Mullen et al. |
| 8,393,545 B1 | 3/2013 | Mullen et al. |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| D687,094 S | 7/2013 | Mullen et al. |
| D687,095 S | 7/2013 | Mullen et al. |
| 8,485,437 B2 | 7/2013 | Mullen et al. |
| 8,485,446 B1 | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| D692,053 S | 10/2013 | Mullen et al. |
| 8,561,894 B1 | 10/2013 | Mullen et al. |
| 8,567,679 B1 | 10/2013 | Mullen et al. |
| 9,378,599 B2 | 6/2016 | Lee |
| 9,681,293 B2 | 6/2017 | Schwager |
| 9,965,911 B2* | 5/2018 | Wishne ............... G07C 9/00309 |
| 2005/0051620 A1* | 3/2005 | DiLuoffo ............... G06Q 30/06 235/382 |
| 2005/0165806 A1 | 7/2005 | Roatis et al. |
| 2006/0114100 A1 | 6/2006 | Ghabra et al. |
| 2008/0029607 A1 | 2/2008 | Mullen |
| 2008/0035738 A1 | 2/2008 | Mullen |
| 2008/0054068 A1 | 3/2008 | Mullen |
| 2008/0054079 A1 | 3/2008 | Mullen |
| 2008/0054081 A1 | 3/2008 | Mullen |
| 2008/0061929 A1 | 3/2008 | Cromer et al. |
| 2008/0065555 A1 | 3/2008 | Mullen |
| 2008/0302869 A1 | 12/2008 | Mullen |
| 2008/0302876 A1 | 12/2008 | Mullen |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0308921 A1 | 12/2009 | Mullen |
| 2010/0052851 A1 | 3/2010 | Kaehler |
| 2010/0144269 A1* | 6/2010 | Do ...................... G06K 7/0008 455/41.1 |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2012/0028702 A1 | 2/2012 | Mullen et al. |
| 2012/0037709 A1 | 2/2012 | Cloutier et al. |
| 2012/0197708 A1 | 8/2012 | Mullen et al. |
| 2012/0209744 A1 | 8/2012 | Mullen et al. |
| 2012/0254037 A1 | 10/2012 | Mullen |
| 2012/0254038 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0315848 A1* | 12/2012 | Smith ...................... H04B 5/02 455/41.1 |
| 2012/0318871 A1 | 12/2012 | Mullen et al. |
| 2012/0326013 A1 | 12/2012 | Cloutier et al. |
| 2013/0020396 A1 | 1/2013 | Mullen et al. |

(56) References Cited

U.S. PATENT DOCUMENTS

| | | |
|---|---|---|
| 2013/0054975 A1 | 2/2013 | Wang |
| 2013/0217152 A1 | 8/2013 | Mullen et al. |
| 2013/0241694 A1* | 9/2013 | Sharma .................. G08C 17/02 340/5.64 |
| 2014/0078543 A1 | 3/2014 | Kawasaki et al. |
| 2014/0187289 A1 | 7/2014 | Cataldo et al. |
| 2014/0360232 A1 | 12/2014 | Al-Kahwati et al. |
| 2014/0365773 A1 | 12/2014 | Gerhardt et al. |
| 2015/0199863 A1* | 7/2015 | Scoggins ........... G07C 9/00904 340/5.25 |

OTHER PUBLICATIONS

International Search Report and Written Opinion in related PCT Application No. PCT/US2016/065373, dated Apr. 27, 2017.
International Preliminary Report on Patentability in related PCT Application No. PCT/US2016/065373, dated Jun. 12, 2018.

* cited by examiner

ELECTRONIC ACCESS CONTROL SYSTEM

CROSS-REFERENCE TO RELATED APPLICATION

This application is a Continuation of U.S. patent application Ser. No. 15/371,821, now allowed, entitled "Electronic Access Control System", filed Dec. 7, 2016, which claims the benefit of U.S. Provisional Application No. 62/263,801, entitled "Electronic Access Control System", filed Dec. 7, 2015, the entire contents and substance of all of which are fully incorporated by reference.

BACKGROUND

Checking-in and accessing a room at a temporary dwelling (e.g., a hotel, resort, etc.) is currently a multi-step process for guests. Guests must first stop at the hotel front-desk and wait in line to check-in and receive their key card before heading to their hotel room and swiping the key card to unlock the corresponding room. Even if the guests check-in to the hotel ahead of their arrival, they must still wait to receive their key card before they can access their hotel room, adding undesirable wait time for the guests and increasing the burden on the hotel front-desk staff. After obtaining their hotel room key card, guests are tasked with carrying and keeping track of an extra plastic key card for the duration of their stay, further inconveniencing the guests. Making matters worse, plastic key cards frequently experience performance issues due to their low quality construction (e.g., low coercivity mag stripes on the back of most hotel key cards are low cost but prone to de-magnetization upon exposure to electronic devices) and damage during the guests' stay, sometimes requiring the guests to make a repeat trip to the hotel front-desk for a replacement key card.

To expedite the hotel check-in process and improve the reliability of hotel key cards, some hotels are experimenting with contactless door locks (e.g., door locks that use Near Field Communications "NFC," Bluetooth Low Energy "BLE," or Radio Frequency Identification "RFID" technologies). For example, some hotels are providing guests with a physical contactless key card for unlocking the contactless door locks to access their rooms. While helpful in overcoming issues with swiping the plastic key cards, providing the guests with a physical contactless key card fails to reduce the burden on the guests and hotel staff of checking-in and carrying the card.

Accordingly, there is a need for improved devices, systems, and methods that expedite the process for hotel guests to check-in and access their hotel room and reduce the inconvenience on hotel guests of carrying (and not losing) an extra key card, and embodiments of the present disclosure are directed to this and other considerations.

SUMMARY

Disclosed embodiments provide systems and methods for authenticating a passive smart device for unlocking an electronic lock (e.g., an entryway lock for a hotel room, resort room, or other temporary dwelling).

Consistent with the disclosed embodiments, the system may include one or more memory devices storing instructions, and one or more processors configured to execute the instructions to perform steps of a method to authenticate a smart device for unlocking an electronic lock (e.g., to access a locked hotel room). The system may execute the instructions to receive an authentication request from a computing device. The authentication request may include identification ("ID") data associated with the smart device. In response, the system may determine whether the authentication request corresponds with stored authentication data. Based on this determination, the system may store the ID data associated with the smart device to authenticate the smart device so that it may be used to unlock the electronic lock.

Consistent with the disclosed embodiments, methods for authenticating a smart device for unlocking an electronic lock are also provided.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
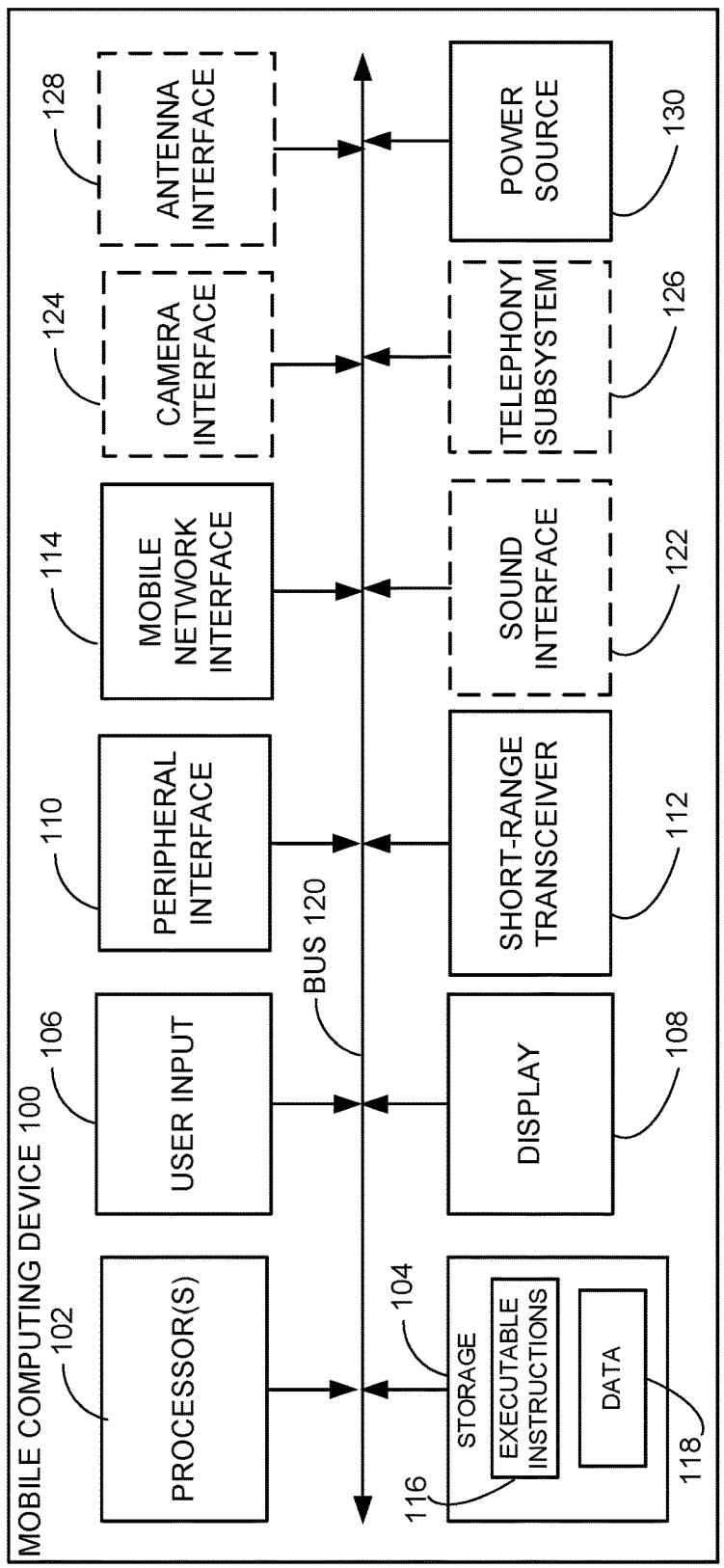
FIG. 1 is a block diagram of a mobile computing device, such as a smartphone, in accordance with an example implementation of the disclosed technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for authenticating a passive smart device for unlocking an electronic lock (e.g., an entryway lock for a hotel room, resort room, or other temporary dwelling). The system may include one or more memory devices storing instructions, and one or more processors configured to execute the instructions to perform steps of a method. Specifically, in some embodiments, the system may allow a hotel guest (or soon-to-be guest) to authenticate her passive smart device (e.g., a payment card having NFC, BLE, or RFID technologies) and use it to access her hotel room. To accomplish this, the system may execute the instructions to receive an authentication request from a computing device (e.g., the hotel guest's smart phone or personal computer). The authentication request may include identification ("ID") data associated with the passive smart device. In response, the system may determine whether the authentication request corresponds with stored authentication data. In some embodiments, for example, this may involve confirming that the authentication request came from a stored phone number associated with the hotel guest, confirming that the passive smart device ID information is associated with stored payment information (or other stored information) for the hotel guest, or another verification of the computing device and/or passive smart device. Based on this determination, the system may store the ID data associated with the passive smart device. At this point, the passive smart device is authenticated and may be used to unlock the electronic lock.

When the passive mobile device enters a predetermined location range (e.g., enters within a predetermined distance of the hotel room door), the system may detect the passive mobile device or receive detection data corresponding to a detection. In response to a detection, the system may obtain an identifier from the passive mobile device and determine whether the obtained identifier corresponds with the stored ID data. In this fashion, the system may confirm that the passive mobile device is authenticated with respect to the electronic lock of the approached hotel room door. Based on this determination, the system may direct the electronic lock to transition from a locked state to an unlocked state, thereby allowing the hotel guest to access her room.

In another aspect, a non-transitory computer-readable medium storing instructions is disclosed. The instructions, when executed by one or more processors, may cause a mobile computing device to perform steps of a method for authenticating a smart device. Specifically, the mobile computing device may obtain check-in information for a user, transmit the check-in information to a key server, and obtain key data from the key server. The mobile computing device may also establish electronic communication with a smart device, and transmit the key data and the at least one key limitation to the smart device. In some embodiments, the electronic communication established with the smart device provides power to a power collection circuit on the smart device.

In yet another aspect, a smart device is disclosed including a processor, an energy storage device, a wireless transceiver, and memory, operatively connected to the processor. The memory includes instructions which, when executed by the processor, may cause the smart device to perform steps of a method for transmitting a key (which may contain encrypted information) to an electronic lock. Specifically, the smart device may wirelessly pair with a mobile computing device, and obtain an encrypted key and at least one encrypted key limitation from the mobile computing device. The smart device may also obtain a wireless service communication request from a lock. In response, the smart device may determine whether the at least one encrypted key limitation has been met, and based on the determination, transmit the encrypted key to the lock.

In a further aspect, a computing device is also disclosed including a processor, an energy storage device, at least one wireless transceiver, at least one user input device, and memory. The memory includes instructions which, when executed by the processor, may cause the computing device to perform steps of a method for transmitting a key (which may contain encrypted information) to a smart device. Specifically, the computing device may obtain remote check-information from a user, and transmit the remote check-in information to an encrypted key server. The computing device may then obtain an encrypted key from the encrypted key server and generate at least one encrypted key limitation. The computing device may wirelessly pair with a smart device, and transmit the encrypted key and the at least one encrypted key limitation to the smart device.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates a computing device 100 that may be used to implement the disclosed technology. The device 100 may be used to implement, for example, one or more components of the system shown in FIGS. 4 and 5, as described in greater detail herein. As another example, the device 100 may be used to implement the methods of FIGS. 6-9, as described in greater detail herein. In some implementations, the computing device 100 may be a mobile computing device, such as a smart phone, tablet computer, smart wearable device, or portable laptop computer. In another embodiment, the computing device 100 may be a stationary computing device, such as a stationary desktop or laptop computer.

In some embodiments, the computing device 100 may include one or more processors 102 operatively connected to a storage component 104, one or more user input devices 106, a display 108 (or a display interface), a peripheral interface 110, a short-range transceiver 112, a mobile network interface 114 in communication with processor 102, a bus 120 configured to facilitate communication between the various components of the computing device 100, and a power source 130 configured to power one or more components of the computing device 100. Optionally, the computing device 100 may further include a sound interface 122, a camera interface 124, a telephony subsystem 126, and an antenna interface 128.

The processor 102 may include one or more of a microprocessor, microcontroller, digital signal processor, co-processor or the like or combinations thereof capable of executing stored instructions and operating upon stored data. The storage component 104 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions 116 and data 118. In one embodiment, the processing techniques described herein are implemented as a combination of executable instructions and data within the storage component 104.

The user input device 106 may include any mechanism for providing user input to the processor(s) 102. For example, in some embodiments, the user input device 106 may include a keyboard, a mouse, a touch screen, a trackball, a directional pad, a track pad, a touch-verified track pad, a presence-sensitive track pad, a presence-sensitive display, a scroll wheel, a digital camera, a digital video camera, a web camera, a microphone, a sensor, a microphone and suitable voice recognition application, or any other means whereby a user of the device 100 may provide input data to the processor(s) 102. In other embodiments, the user input device 106 may include a user input device interface configured to receive or communicate with a user input device. For example, the user input device 106 may serve as a keyboard interface that provides a communication interface to a physical or virtual keyboard. In other exemplary embodiments, the user input device 106 may serve as the sound interface 122 and/or the camera interface 124 to present information to a user and capture information from a device's environment including instructions from the device's user. As additional examples, input components may include an accelerometer (e.g., for movement detection), a magnetometer, a digital camera, a microphone (e.g., for sound detection), an infrared sensor, and an optical sensor.

The display 108 may include any conventional display mechanism such as a flat panel display, projector, or any other display mechanism known to those having ordinary skill in the art. In some embodiments, the display 108, in conjunction with suitable stored instructions 116, may be used to implement a graphical user interface. In other embodiments, the display 108 may include a display interface configured to receive or communicate with one or more external displays.

The peripheral interface 110 may include the hardware, firmware and/or software that enables communication with various peripheral devices, such as media drives (e.g., magnetic disk, solid state, or optical disk drives), other processing devices, or any other input source used in connection with the instant techniques. In some embodiments, the peripheral interface 110 may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

In some embodiments, the short-range transceiver 112 may be configured to communicate with compatible devices and ID tags when they are within a predetermined range. The short-range transceiver 112 may be compatible with one or more of: radio-frequency identification (RFID), near-field communication (NFC), Bluetooth®, low-energy Bluetooth® (BLE), WiFi™, ZigBee®, ambient backscatter communications (ABC) protocols or similar technologies.

The mobile network interface 114 may provide access to a cellular network, the Internet, or another wide-area network. In some embodiments, the mobile network interface 114 may include hardware, firmware, and/or software that allows the processor(s) 102 to communicate with other devices via wired or wireless networks, whether local or wide area, private or public, as known in the art. The power source 130 may be configured to provide an appropriate alternating current (AC) or direct current (DC) to power components.

In exemplary embodiments of the disclosed technology, the computing device 100 may include any number of hardware and/or software applications that are executed to facilitate any of the operations. In example implementations, one or more I/O interfaces facilitate communication between the computing device 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the computing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated.

Figure 2:
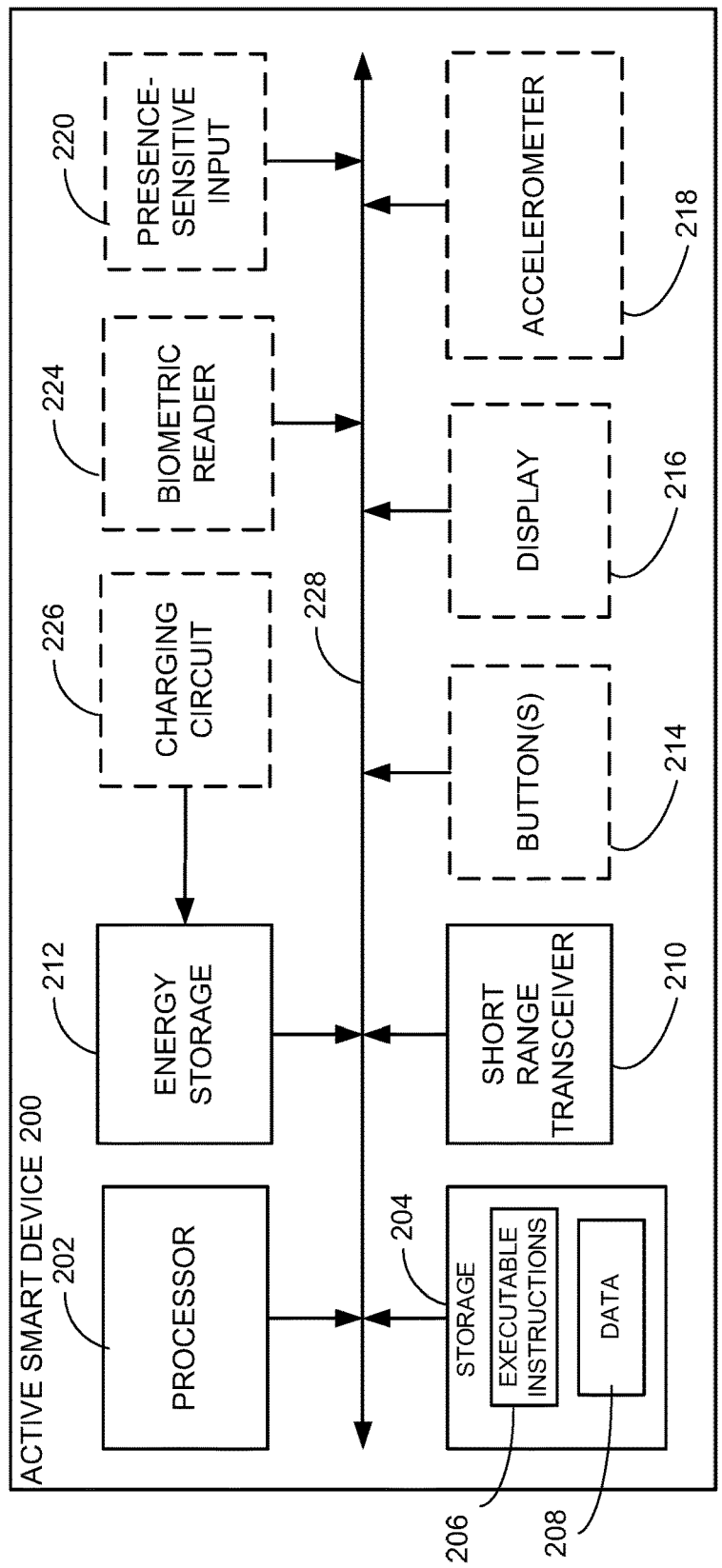
FIG. 2 is a block diagram of an active smart device, in accordance with an example implementation of the disclosed technology.

FIG. 2 is a block diagram of an active smart device 200 illustrating some of its components and their functional relationships in an example implementation of the disclosed technology. An active smart device 200 may include a power source and actively "listen" for compatible devices and may be capable of searching for compatible devices. The active smart device 200 may be packaged in many forms, including, for example, a credit or payment card, a wearable device, or a key fob.

In some implementations, the active smart device 200 includes a processor 202, an energy storage device 212, a storage component 204, including executable instructions 206 and data 208, and a short-range transceiver 210, all operatively connected by a bus 228. The active smart device 200 may also include one or more buttons 214, a display 216, an accelerometer 218, a presence-sensitive input 220, and/or a biometric reader 224, all operatively connected to the bus 228.

The one or more buttons 214 may be metal-dome type contacts, conductive rubber contacts, or capacitive touch points. The display 216 may be any type of conventional LCD, OLED, or eInk display, or one or more discrete LEDs. The accelerometer 218 may be configured to measure acceleration in one or more directions or axes, and is suitable for detecting and interpreting physical gestures performed with the active smart device 200. The presence-sensitive input device 220 may be sensitive to the close proximity of adjacent objects or fingers, and includes, without limitation, resistive and capacitive touchscreen overlays, a touchpad, a depth camera, which may be integrated with a display. The biometric reader 224 may be configured to record one or more identifying measurements of the human body and relay them to the processor for identification purposes. The biometric reader 224 may include, without limitation, a fingerprint scanner or a camera for facial recognition.

The active smart device 200 may also include a charging circuit 226 connected to the energy storage device 212. The charging circuit 226 may be configured to charge the energy storage device 212 from a conventional physical connection (e.g. a USB connection) or wirelessly (e.g. an induction charging system), as will be understood to those skilled in the art. In some embodiments, energy storage device 212 is a device configured to store electrical energy and discharge it as needed, such as a battery, capacitor, ultra-capacitor, or appropriate combinations thereof.

Figure 3:
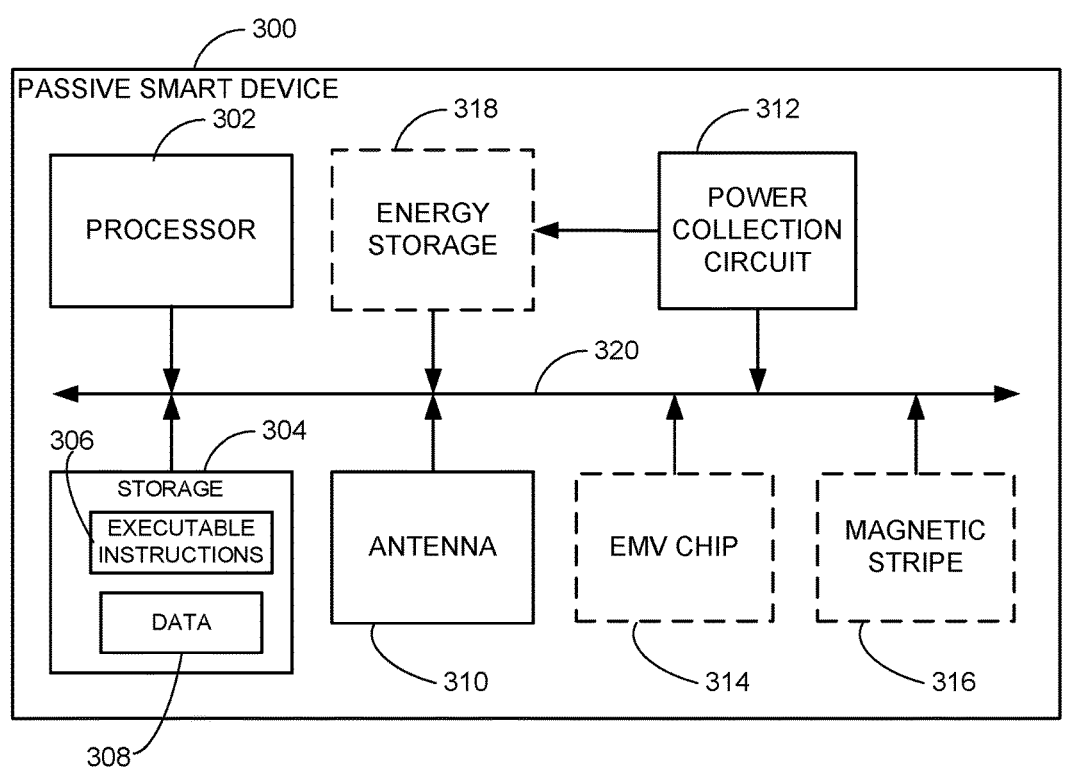
FIG. 3 is a block diagram of a passive smart device, in accordance with an example implementation of the disclosed technology.

FIG. 3 is a block diagram of a passive smart device 300 illustrating some of its components and their functional relationships in accordance with an example implementation of the disclosed technology. The passive smart device 300 may not be self-powered or include an internal or dedicated power source. The passive smart device 300 may passively "listen" for a compatible interrogation signal, which it then uses to power its logic circuits and antenna. The passive smart device 300 may be packaged in many forms, including a sticker or label, a credit, debit, or payment card, a wearable device (e.g. a smart watch, ring, or bracelet), or a key fob. In some examples, passive smart device 300 includes a passive RFID tag, while in others it includes passive NFC tags. In some implementations, the passive smart device 300 includes a processor 302, an antenna 310, a storage component 304 including executable instructions 306 and data 308, and a power collection circuit 312, all operatively connected by a bus 320. The passive smart device 300 may also include an energy storage device 318.

In operation, the antenna 310 of the passive smart device 300 may receive a compatible interrogation signal, which the power collection circuit 312 converts to a suitable electrical voltage to power the other circuit components. In some embodiments, the power collection circuit 312 may store excess converted energy in the energy storage device 318. In some embodiments, the passive smart device 300 may include an EMV chip 314 and/or a magnetic stripe 316 for conducting credit, debit or other financial card transactions using the appropriate card-reading technology, as will be understood by those skilled in the art.

In some embodiments, as described above, the passive smart device 300 may take the form of a smart card, such as an EMV card, chip and PIN card, chip and signature card, or an RFID contactless card, issued by a financial service provider. The smart card may store data on an integrated circuit or other memory. Data may be exchanged in application protocol data units (APDUs) between the smart card and an appropriate reader (e.g., a payment card terminal, a user's smartphone or an electronic lock in accordance with an implementation of the disclosed technology) following predetermined protocols, including for example, ISO/IEC 7816, In some embodiments, this involves the reader sending a command to a smart card, the smart card processing the command, determining an appropriate response to the command, and sending a response to the reader. In some embodiments, the initial request sent to the smart card may identify a particular application stored on the smart card by exchanging an application identifier, which is used to address an application stored on the card and may further include a registered application provider identifier. The request may also include a proprietary application identifier extension that differentiates amongst different applications stored on the smart card.

In some embodiments, the reader may request the smart card to provide the processing options available on the smart card. The request may include data elements required in a processing options data objects list supplied by the smart card to the reader during the application selection exchange. The smart card may further provide a profile of functions that can be performed and the location of files and data stored on the smart card that the reader needs to read from the smart card. The reader may issue a read record command to the smart card to obtain the data needed for a transaction. The smart card may also store authentication data that can be read from the smart card to determine if the reader must receive additional data from the smart card user to verify the transaction. In some embodiments, the issuer of the smart card may update the data or files stored on the smart card after it has been issued, such as through issuer script processing, for example. A command can be sent to the smart card using issuer script processing to change card parameters or add files to the smart card storage. In some embodiments, the communications to and/or from the smart card may be encrypted or include encrypted data.

Figure 4:
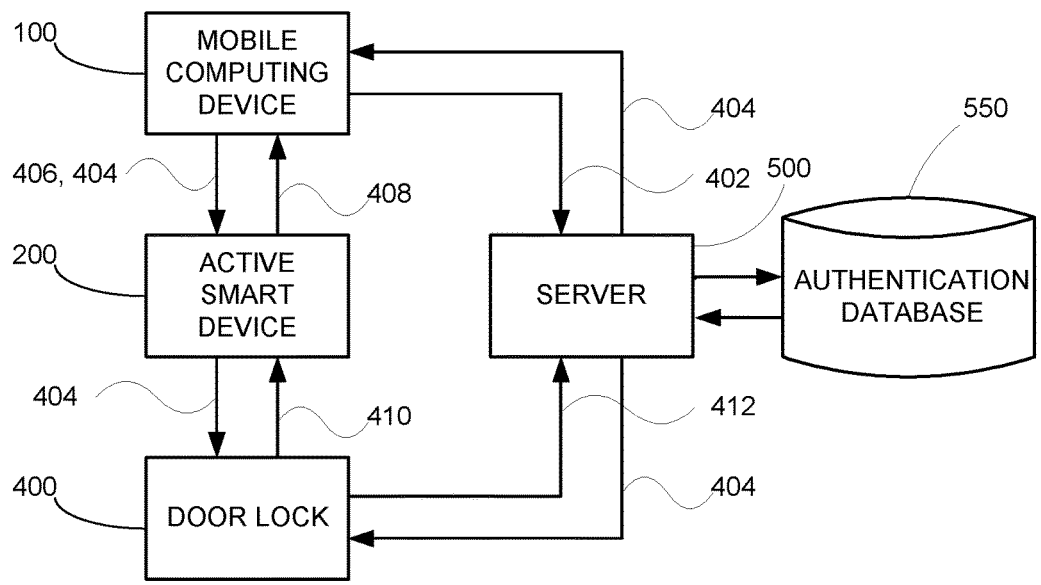
FIG. 4 is an overview of an environment illustrating components, including an active smart device, that may be used in an example implementation of the disclosed technology.

FIG. 4 shows communication within an exemplary electronic access control system, in accordance with an example implementation of the disclosed technology. The system may include a mobile computing device 100, an active smart device 200, a door lock 400, an encrypted key server 500, and an authentication database 550 in communication with the encrypted key server 500. In one embodiment, the mobile computing device 100 may send a request 402 to the encrypted key server 500 for an encrypted key 404 associated with a particular transaction (e.g. purchasing a hotel room for a particular hotel stay). In some implementations, after authenticating or validating the request, the encrypted key server 500 may return the encrypted key 404 to the mobile computing device 100. The mobile computing device 100 may then send a pairing request 406 to the active smart device 200, which in turn responds with a link key 408, pairing the devices. Once the devices are paired, the mobile computing device 100 may send the encrypted key 404 to the active smart device 200. When the user wants to access the restricted area (e.g. her hotel room), the active smart device 200 may receive a pairing request or an interrogation signal 410 from the door lock 400. The active smart device 200 may then respond with the encrypted key 404. It is also contemplated that, in some embodiments, the encrypted key 404 may be not be encrypted or may contain some encrypted and unencrypted data, and the encrypted key server 500 may transmit unencrypted and partially encrypted data.

In some embodiments the encrypted key server 500 may send the encrypted key 404 to the door lock 400 and the mobile computing device 100 simultaneously. In other embodiments, the door lock 400 may request 412 the encrypted key 404 for comparison after receiving the encrypted key 404 from the active smart device 200. In other embodiments, the door lock 400 may transmit the received encrypted key 404 to the encrypted key server 500 for comparison to stored key data associated with the active smart device 200, and provide a response to the door lock 400 directing the door lock 400 to unlock (e.g., to transition from a locked state to an unlocked state). The authentication database 550 may be configured to store authentication data associated with a hotel guest (and devices associated with the hotel guest). The stored authentication data may later be used to determine whether a device attempting to communication with the system is associated with an authenticated device of a hotel guest.

Figure 5:
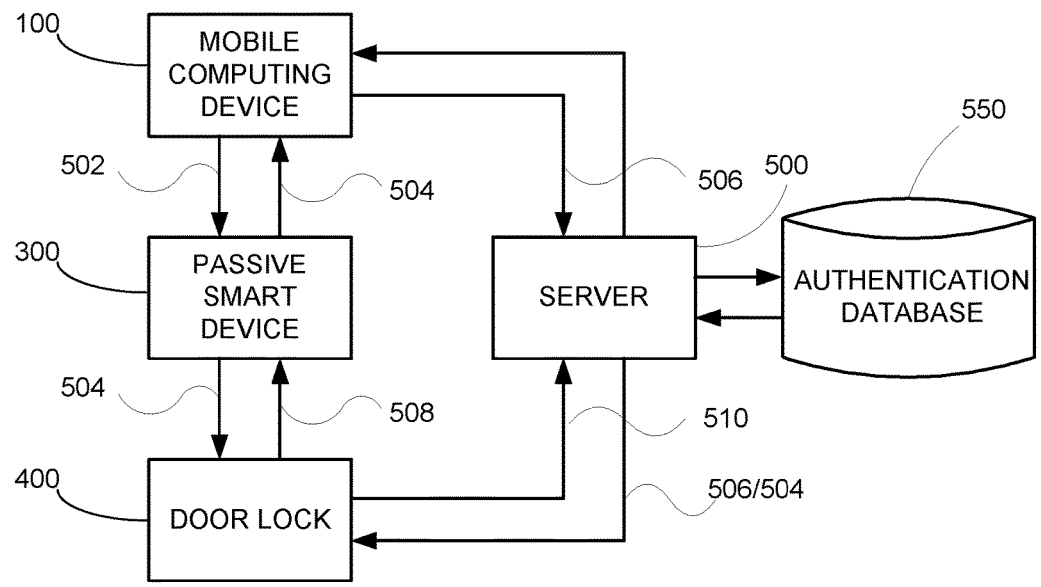
FIG. 5 is an overview of an environment illustrating components, including a passive smart device, that may be used in an example implementation of the disclosed technology.

FIG. 5 shows communication within an exemplary electronic access control system, in accordance with an example implementation of the disclosed technology. The system includes a mobile computing device 100, a passive smart device 300, a door lock 400, an encrypted key server 500, and an authentication database 550 in communication with the encrypted key server 500. In one embodiment, the mobile computing device 100 may send an interrogation signal 502 to the passive smart device 300, which in turn responds with an unencrypted key 504. The mobile computing device 100 then generates an encrypted key 506 and transmits the encrypted key 506 to the encrypted key server 500. When the user wants to access the restricted area (e.g. her hotel room), the passive smart device 300 may receive an interrogation signal 508 from the door lock 400. The passive smart device 300 may respond with the unencrypted key 504. It is also contemplated that, in some embodiments, the encrypted key 506 may be not be encrypted or may contain some encrypted and unencrypted data, and the encrypted key server 500 may transmit unencrypted and partially encrypted data.

In some embodiments the encrypted key server 500 may send the encrypted key 506 to the door lock 400. In other embodiments it may decrypt the encrypted key 506 and send the unencrypted key 504 to the door lock 400. The choice of embodiment will likely depend on security concerns. In some embodiments, in which the door lock 400 is hardwired to the encrypted key server 500, sending an unencrypted key 504 may present a low security risk and simplify the door lock 400, because it will not need to decrypt the encrypted key. However, when the key is sent to the door lock 400 over the air (e.g. via WiFi™), the security risks are higher and a provider may prefer to send the encrypted key 506 which the door lock 400 must decrypt. In some embodiments, the encrypted key server 500 may send the key 504/506 to the door lock 400 at essentially the same time it receives it from the mobile computing device 100. In other embodiments, the door lock 400 may request 510 the key 504/506 for comparison after receiving the unencrypted key 504 from the passive smart device 200. In other embodiments, the door lock 400 may transmit the received encrypted key 504/506 to the encrypted key server 500 for comparison to stored key data associated with the smart device, and provide a response to the door lock 400 directing the door lock to unlock. The authentication database 550 may be configured to store authentication data associated with a hotel guest (and devices associated with the hotel guest). The stored authentication data may later be used to determine whether a device attempting to communication with the system is associated with an authenticated device of a hotel guest.

Figure 6:
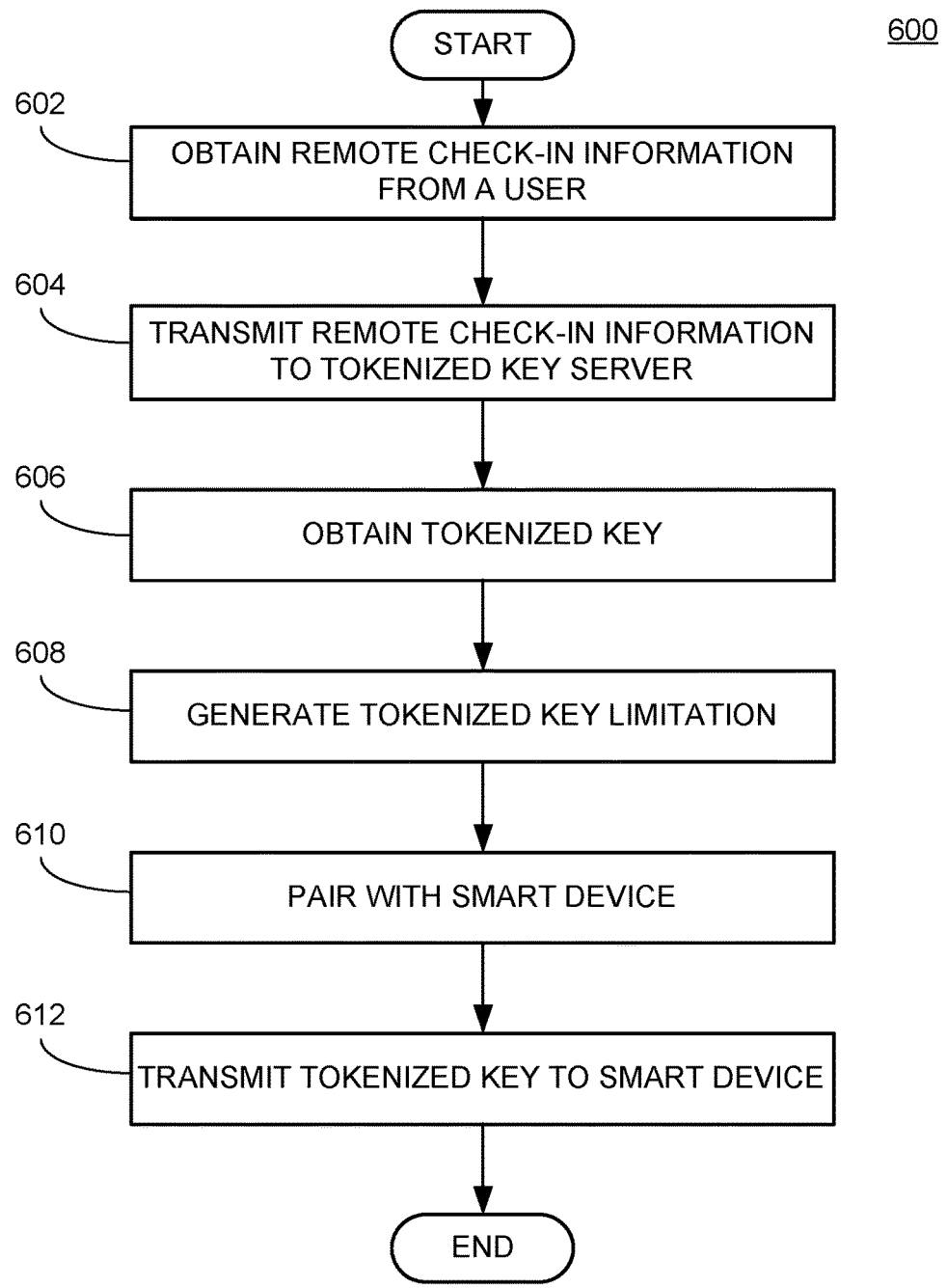
FIG. 6 is a flowchart of one method of using a mobile computing device within an electronic access control system, in accordance with an example implementation of the disclosed technology.

FIG. 6 shows an exemplary method 600 of using a mobile computing device 100 within an electronic access control system which uses a smart device, such as active smart device 200 or passive smart device 300, in accordance with an example implementation of the disclosed technology. This flowchart represents one embodiment of using the system of FIG. 4, from the perspective of the mobile computing device 100. At 602, the mobile computing device 100 may obtain remote check-in information from a user (e.g., directly from a user input 106 of the computing device 100. In one embodiment, the remote check-in information may include a confirmation of an existing reservation for access to a secure facility (e.g. a hotel room). In another embodiment, the remote check-in information may include making an online reservation and simultaneously checking-in. At 604, the mobile computing device 100 may transmit the remote check-in information to the encrypted key server 500. At 606, the encrypted key server 500 may return an encrypted key based on the remote check-in information. In some embodiments, the encrypted key server 500 also sends additional metadata with the encrypted key. For example, the encrypted key server 500 may send data regarding the duration of the user's stay, which the mobile computing device 100 may limit the valid time of use for the encrypted key.

At 608, the mobile computing device 100 may generate an encrypted key limitation. The encrypted key limitation may limit the circumstances under which the smart device, such as active smart device 200 or passive smart device 300, will transmit the encrypted key. Non-exhaustive examples of encrypted key limitations include: a time period during which the encrypted key is valid; a minimum signal strength (indicating proximity to the requesting device); a requesting device ID number (e.g. a smart lock ID associated with the assigned room number); gestures performed using the smart device and recorded using accelerometer (e.g. turning it over and back, shaking it side-to-side, etc.); gestures performed on a presence-sensitive device (e.g. swiping left or right, swiping a letter, numeral, other character, or other stored pattern, etc.); depressing one or more buttons on the smart device, including, but not limited to, a specific pattern (e.g., a code); and recording a required biometric identity (e.g. a fingerprint, facial recognition, speaker recognition (voice biometrics), speaker verification (behavioral biometrics), etc.). At 610, the mobile computing device 100 may pair with the smart device. At 612, the mobile computing device 100 may transmit the encrypted key to the smart device 200 or 300. After receiving a valid key from the smart device 200 or 300, system may direct the electronic lock to transition from a locked state to an unlocked state (not shown), thereby allowing the hotel guest to enter the room.

Figure 7:
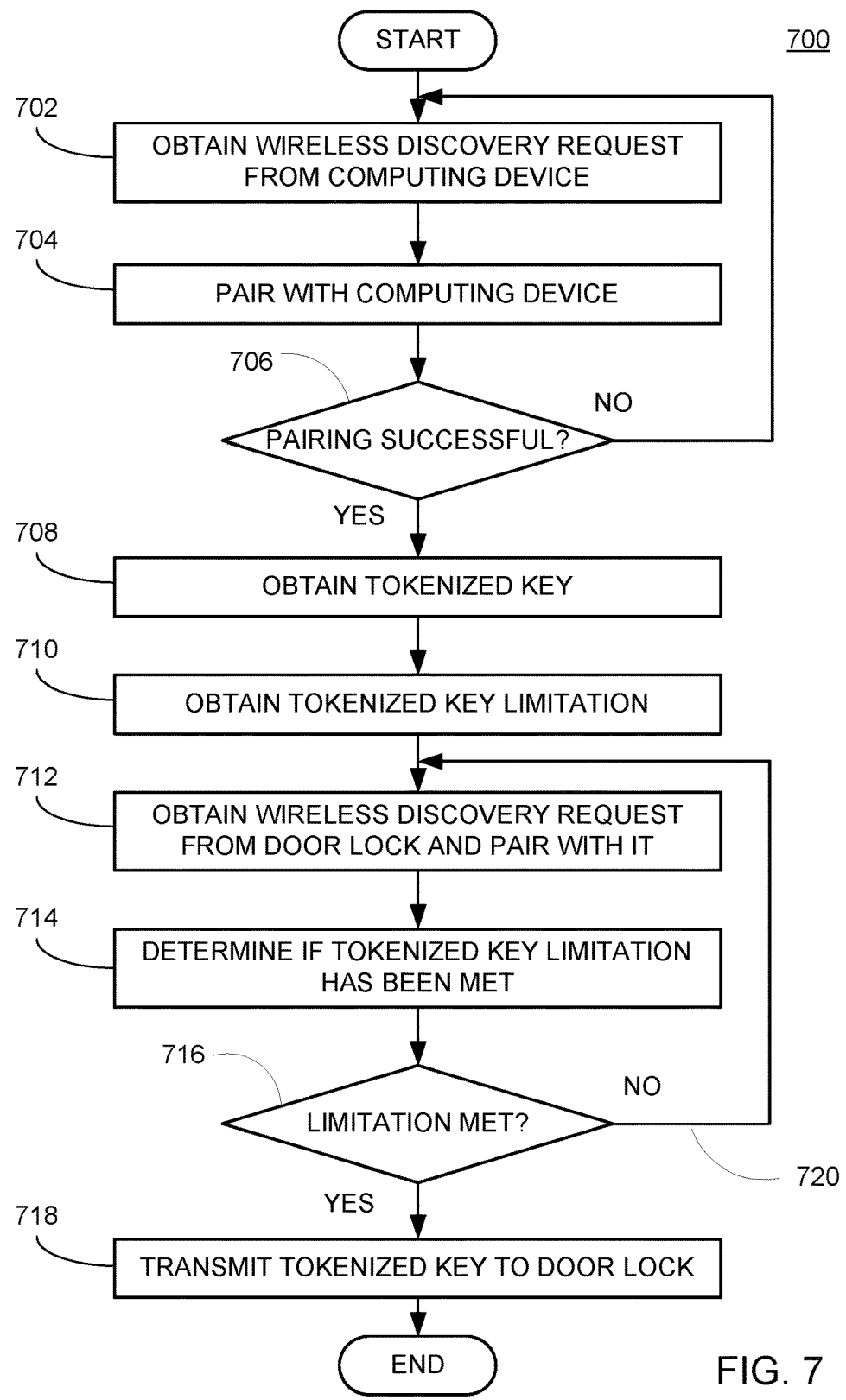
FIG. 7 is a flowchart of one method of using an active smart device within an electronic access control system, in accordance with an example implementation of the disclosed technology.

FIG. 7 shows an exemplary method 700 of using an active smart device 200 within an electronic access control system in accordance with an example implementation of the disclosed technology. This flowchart represents one embodiment of using the system of FIG. 4 from the perspective of a smart device, such as active smart device 200 or passive smart device 300. For illustrative purposes, this exemplary method is described using an active smart device 200, but it will be appreciated that a passive smart device 300 could also be used in such method. At 702, the active smart device 200 may receive a pairing request from the mobile computing device 100. At 704, the active smart device 200 may attempt to pair with the mobile computing device 100. At 706, the active smart device 200 may determine whether the pairing was successful. If it was successful, it may proceed to obtain the encrypted key at 708. If the pairing was unsuccessful, the active smart device 200 may wait for another discovery request.

At 710, the active smart device 200 may obtain the encrypted key limitation from the mobile computing device 100. After a triggering event, such as, for example, a detection of the active smart device 200 when it enters a predetermine range of the door lock 400, the active smart device 200 may obtain a pairing request or interrogation signal from the door lock 400, shown at 712. At 714, the active smart device 200 may determine whether the encrypted key limitation has been met. If the limitation has been met, the active smart device 200 may transmit the encrypted key to the door lock 400, as shown at 718. If the encrypted key limitation has not been met 720, the active smart device 200 may standby (e.g., without taking further action) until receiving another discovery request.

Figure 8:
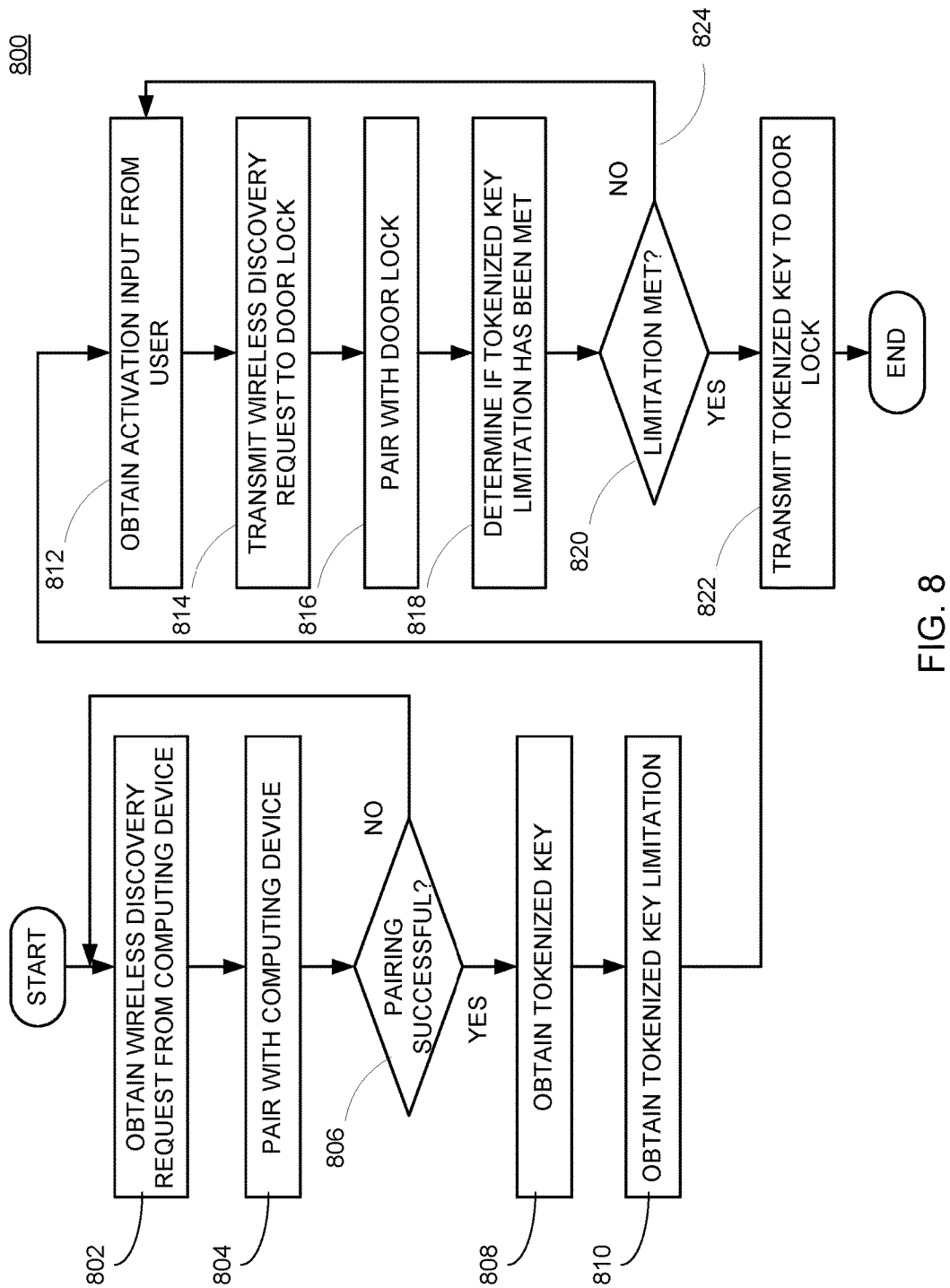
FIG. 8 is a flowchart of one method of using an active smart device to initiate communications within an electronic access control system, in accordance with an example implementation of the disclosed technology.

FIG. 8 shows another exemplary method 800 of using an active smart device 200 within an electronic access control system in accordance with an example implementation of the disclosed technology. This flowchart represents one embodiment of using the system of FIG. 4 from the perspective of the active smart device 200. In this embodiment, the user initiates the interaction between the active smart device 200 and the door lock 400, rather than it being automatic. At 802, the active smart device 200 may receive a pairing request from the mobile computing device 100. At 804, the active smart device 200 may attempt to pair with the mobile computing device 100. At 806, the active smart device 200 may determine whether the pairing was successful. If it was successful, it may proceed to obtain the encrypted key at 808. If it was not successful, the active smart device 200 may standby until it receives another discovery request. At 810, the active smart device 200 may obtain the encrypted key limitation from the mobile computing device 100.

At 812, the active smart device 200 may receive activation input from the user. In some exemplary embodiments, the activation input may be one or more of: a gesture performed using the entire active smart device 200, a gesture performed on a presence-sensitive device, depressing one or more buttons on the active smart device 200, including, but not limited to, a specific pattern (e.g., a code); and recording an require biometric input, as described above. In another embodiment, the activation input may also be the encrypted key limitation. At 814, the active smart device 200 may transmit a pairing request or interrogation signal to the door lock 400 in response to the activation input. At 816, the active smart device 200 may pair with the door lock 400 or receives another appropriate response from the door lock 400. In one embodiment, the response from the door lock 400 may be the encrypted key limitation (e.g. the room number). At 818, the active smart device 200 may determine whether the encrypted key limitation has been met. If it has, the active smart device 200 may transmit 822 the encrypted key to the door lock 400. If not, the active smart device 200 may standby (e.g., without taking further action) until receiving a valid activation input from a user.

Figure 9:
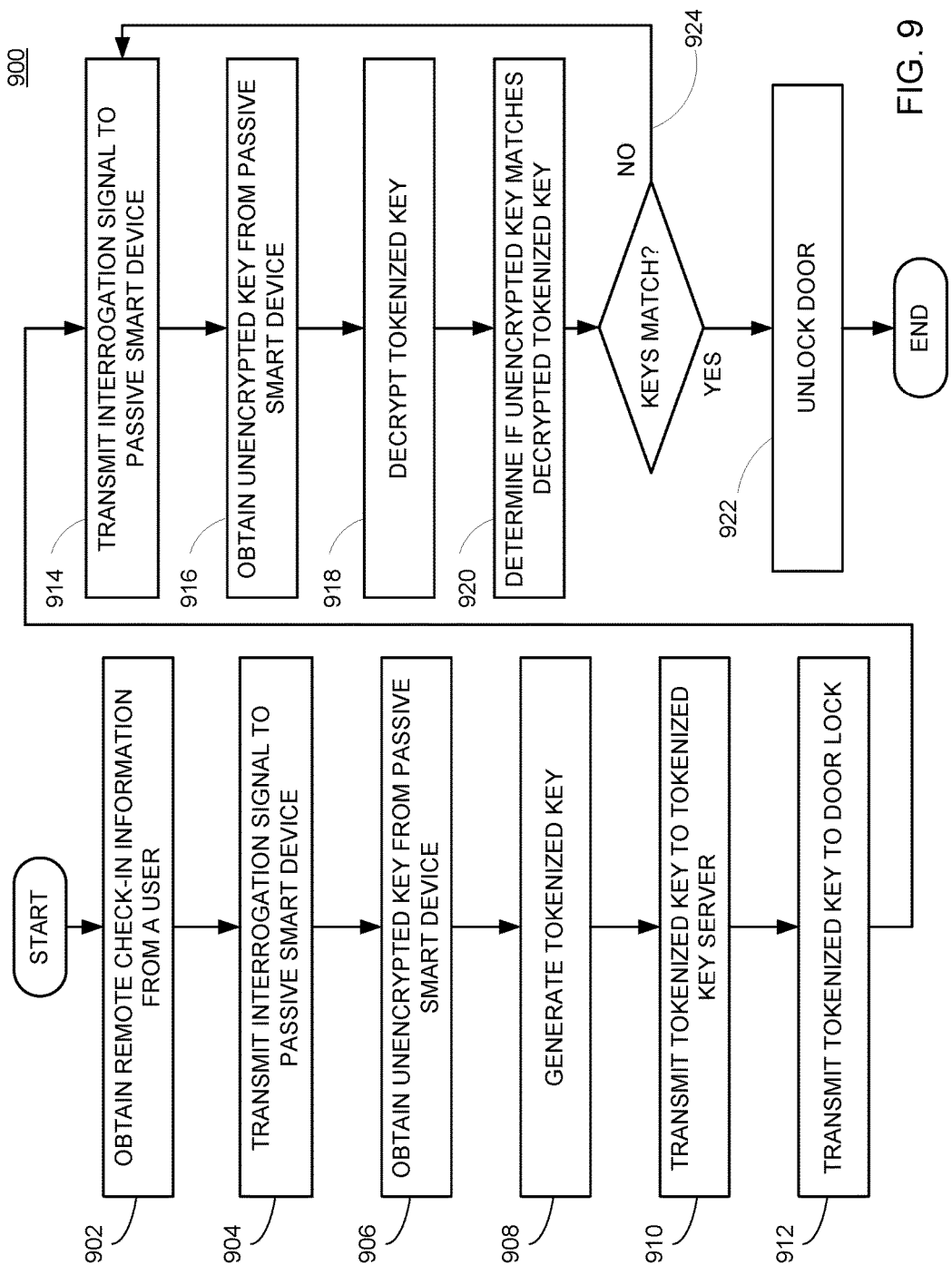
FIG. 9 is a flowchart of one method of using a passive smart device within an electronic access control system, in accordance with an example implementation of the disclosed technology.

FIG. 9 shows an exemplary method 900 of using an electronic access control system with a passive smart device 200 in accordance with an example implementation of the disclosed technology. This flowchart represents one embodiment of using the system of FIG. 5 with a passive smart device 300. Because the passive smart device 300 may be less suitable for making decisions about authentication, this embodiment authenticates with a different component of the system than the passive smart device 300. In this embodiment, the mobile computing device 100 may encrypt and send the key to the encrypted key server 500, rather than the other way around. This allows the passive smart device 300 to unlock the door using an unencrypted key while maintaining security, because the unencrypted key from the passive smart device 300 may be useless without its encrypted counterpart, in some embodiments, as described herein.

At 902, the mobile computing device 100 may receive check-in information from a user. At 904, the mobile computing device 100 may transmit an interrogation signal to the passive smart device 300. At 906, the passive smart device 300 may return an unencrypted key to the mobile computing device 100 in response to the interrogation signal. At 908, the mobile computing device 100 may create an encrypted key based on the unencrypted key from the passive smart device 200. At 910, the mobile computing device 100 may transmit the encrypted key to the encrypted key server 500. At 912, the encrypted key server 500 may transmit the encrypted key to the door lock 400. As previously noted with respect to another embodiment, the encrypted key server 500 may decrypt the encrypted key and send the unencrypted key to the door lock 400 if the physical security of the facility makes this a low-risk proposition (e.g. if the door lock 400s are hardwired to the server).

At 914, the door lock 400 may transmit an interrogation signal to the passive smart device 300. At 916, the passive smart device 300 may respond to an appropriate interrogation signal with the unencrypted key. At 918, the door lock 400 may decrypt the encrypted key in response to receiving the unencrypted key. At 920, the door lock 400 may determine whether the decrypted key matches the unencrypted key received from the passive smart device 200. If the keys match, 922 the system may direct the electronic lock to transition from a locked state to an unlocked state, thereby allowing the hotel guest to open the door. If the keys don't match, as shown in 924, the door lock 400 may continue to periodically transmit interrogation signals.

Figure 10:
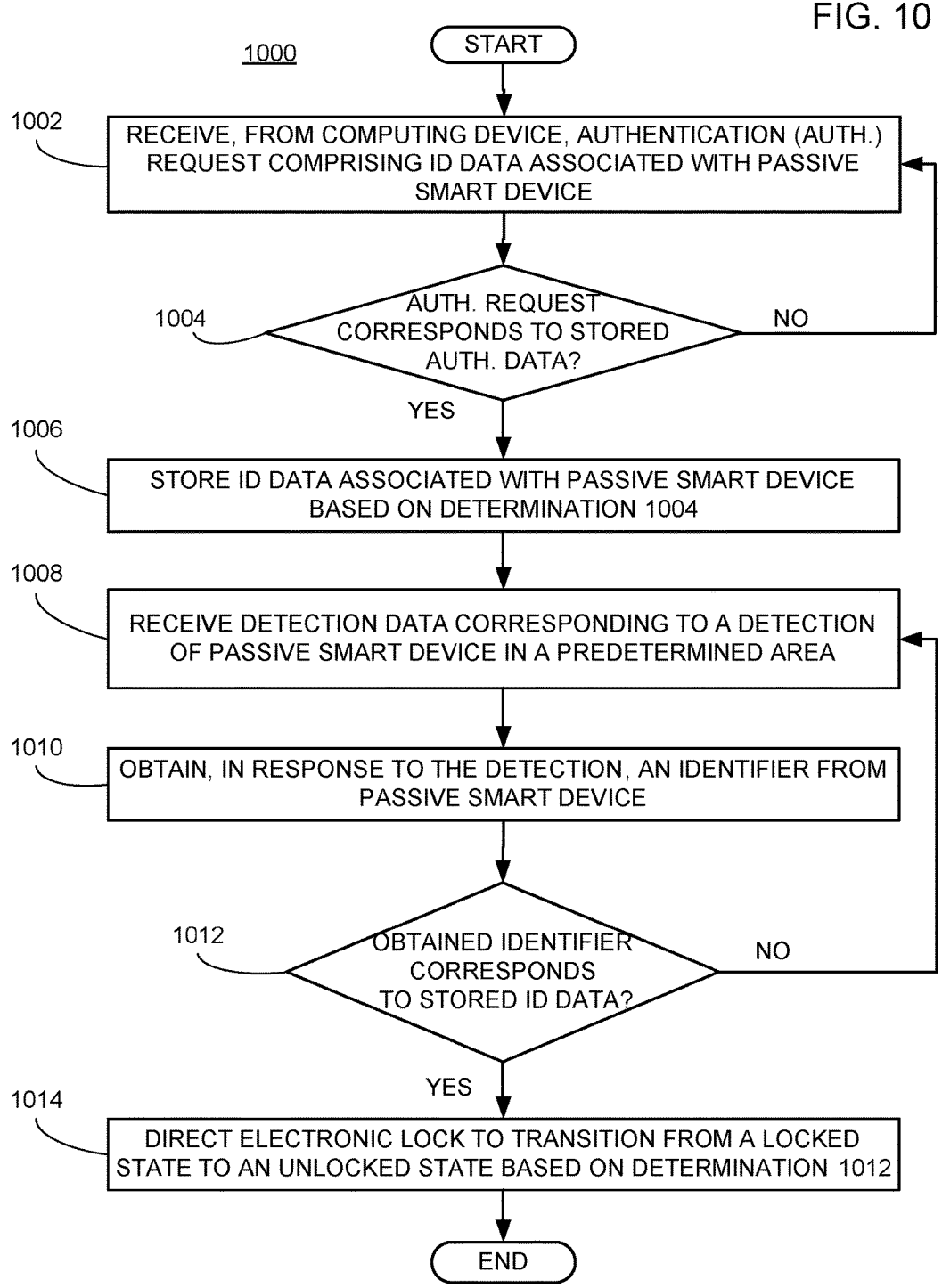
FIG. 10 is a flowchart of one method of authenticating and using a passive smart device within an electronic access control system, in accordance with an exemplary implementation of the disclosed technology.

FIG. 10 shows an exemplary method 1000 for authenticating the passive smart device 300 in accordance with an example implementation of the disclosed technology. This flowchart represents one embodiment of using the system of FIG. 5 with a passive smart device 300. As shown at 1002, the system may receive an authentication request from the computing device 100, which may be a mobile or stationary computing device. The authentication request may comprise ID data associated with the passive smart device 300. For example, the authentication request may include a device ID number or a model number and corresponding key code associated with a device ID number or model number and corresponding key code, or representative numbers or codes thereof, stored on the passive mobile device 300.

After receiving the authentication request, the system may determine 1004 whether the authentication request corresponds to stored authentication data. That is, for example, the system may determine whether the information included in the authentication request corresponds to and/or matches stored information relating to a hotel guest or a device associated with the hotel guest. In this manner, the system may store payment card information when the guest books the hotel reservation, and determine that the authentication request corresponds to the previously used payment card on file for that guest.

Based on the determination 1004, the system may store ID data associated with the passive smart device 300, as shown at 1006. For example, in some embodiments, the server 500 may send the ID data to the authentication database 550 for storage.

Upon a triggering event (e.g., the passive smart device 300 entering a predetermined area), the system may receive detection data 1008 corresponding to a detection of the passive smart device 300. In response, the system may obtain 1010 an identifier from the passive smart device 300. For example, the system may send a request to the passive smart device 300 that powers the passive smart device 300 and enables it to respond to the request by providing the identifier.

The system may determine 1012 whether the obtained identifier corresponds to the stored ID data. For example, the system may compare the number or unique code on the identifier sent by the passive smart device 300 with the stored ID data of the passive smart device on file for the hotel guest at that particular hotel room. Based on the comparison, the system may determine whether the detected passive smart device 300 is an authenticated smart device for that electronic lock. If the detected passive smart device 300 is an authenticated smart device, the system may direct 1014 the electronic lock to transition from a locked state to an unlocked state.

Figure 11:
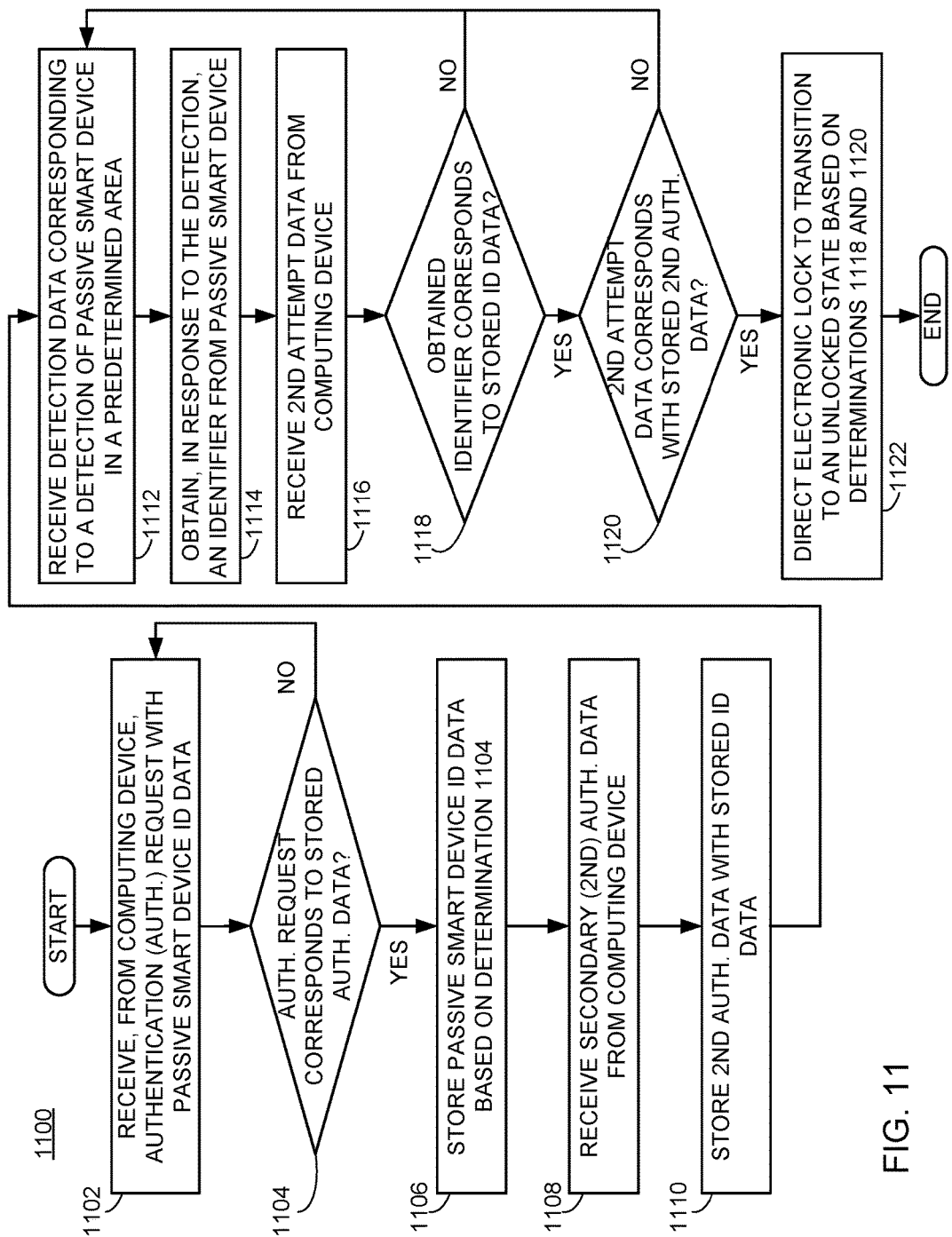
FIG. 11 is a flowchart of one method of multi-level authenticating and using a passive smart device within an electronic access control system, in accordance with another exemplary implementation of the disclosed technology.

FIG. 11 shows another exemplary method 1100 for authenticating the passive smart device 300 in accordance with an example implementation of the disclosed technology. This flowchart represents one embodiment of using the system of FIG. 5 with a passive smart device 300. As shown at 1102, the system may receive an authentication request from the computing device 100, similar to step 1002 of method 1000. The authentication request may comprise ID data associated with the passive smart device 300. For example, the authentication request may include a device ID number or a model number and corresponding key code associated with a device ID number or model number and corresponding key code, or representative numbers or codes thereof, stored on the passive mobile device 300.

After receiving the authentication request, the system may determine 1104 whether the authentication request corresponds to stored authentication data, similar to step 1004 of method 1000. Based on the determination 1104, the system may store ID data associated with the passive smart device 300, as shown at 1106. For example, in some embodiments, the server 500 may send the ID data to the authentication database 550 for storage.

The system may also receive 1108 secondary authentication data, and store 1110 it with the stored ID data. In some embodiments, the secondary authentication data may come from the mobile computing device 100 or from the passive smart device 300, and may be pre-existing, automatically generated, or entered by the user. The secondary authentication data may form an extra layer of security, either by preventing the passive smart device 300 from communicating with certain devices (e.g., locks outside of a predetermined range) or by preventing the system from determining that a detected smart device is authenticated without requiring the secondary authentication data.

Upon a triggering event (e.g., the passive smart device 300 entering a predetermined area), the system may receive detection data 1112 corresponding to a detection of the passive smart device 300. In response, the system may obtain 1114 an identifier from the passive smart device 300. For example, the system may send a request to the passive smart device 300 that powers the passive smart device 300 and enables it to respond to the request by providing the identifier. The system may also receive secondary attempt data 1116 from the computing device 100. The secondary attempt data may correspond with the previously provided secondary authentication data. In some embodiments, the passive smart device 300 may provide the secondary attempt data to the system.

The system may determine 1118 whether the obtained identifier corresponds to the stored ID data and determine 1120 whether the secondary attempt data corresponds with the stored secondary authentication data. For example, the system may compare the number or unique code on the identifier sent by the passive smart device 300 with the stored ID data of the passive smart device on file for the hotel guest at that particular hotel room. As a secondary level of security, the system may further compare the obtained secondary authentication attempt data with the stored secondary authentication data. Based on the comparisons, the system may determine whether the detected passive smart device 300 is an authenticated smart device for that electronic lock. If the detected passive smart device 300 is an authenticated smart device, the system may direct 1122 the electronic lock to transition from a locked state to an unlocked state.

In some embodiments, a smart device may include a processor and an energy storage device operatively connected to the processor. The smart device may also include a wireless transceiver operatively connected to the processor and the energy storage device. The smart device may further include memory operatively connected to the processor. The memory may include instructions which, when executed by the processor, perform a method comprising several steps. One step may include wirelessly pairing with the mobile computing device. Another step may include wirelessly obtaining an encrypted key from the mobile computing device. A further step may include wirelessly obtaining at least one encrypted key limitation from the mobile computing device. Afterwards, a wireless service communication request may be obtained from a lock. Another step may include determining if the at least one encrypted key limitation has been met. After making this determination, the encrypted key may be transmitted to the lock when the at least one encrypted key limitation has been met.

In some embodiments, the method performed when the processor executes the instructions may further include measuring a wireless signal strength from the door lock. The at least one encrypted key limitation may include a minimum wireless signal strength.

In other embodiments, the method performed when the processor executes the instructions may further include obtaining an expiration time from the mobile computing device, and disabling the encrypted key when the expiration time is reached.

In some embodiments, the smart device may include additional components. For example, in one embodiment, the smart device may include an accelerometer, and the at least one encrypted key limitation may include at least one gesture performed with the smart device. In another exemplary embodiment, the smart device may include at least one button, and the at least one encrypted key limitation may include depressing the at least one button one or more times. In yet another embodiment, the smart device may include a biometric reader, and the at least one encrypted key limitation may include a biometric identifier associated with a user. In another embodiment, the smart device may include a presence-sensitivity display, and the at least one encrypted key limitation comprises at least one gesture performed on the presence-sensitivity display. Further, the smart device may include a charging circuit for the energy storage device.

In some embodiments, the wireless transceiver may include at least one of a NFC transceiver, a Bluetooth transceiver, a low-energy Bluetooth transceiver, a RFID transceiver, and an ABC.

In other embodiments, a smart device may include a processor and an energy storage device operatively connected to the processor. The smart device may also include a wireless transceiver operatively connected to the processor and the energy storage device. The smart device may further include memory operatively connected to the processor. The memory may include instructions which, when executed by the processor, perform a method comprising several steps. One step may include obtaining remote check-information from a user. Once obtained, the remote check-in information may be transmitted to an encrypted key server. Another step may include generating at least one encrypted key limitation. A further step may include wirelessly pairing with a smart device. After pairing with the smart device, the encrypted key and the at least one encrypted key limitation may be transmitted to the smart device.

It is contemplated that the method performed when the processor executes the instructions may further include generating an expiration time for the encrypted key, after which it will be disabled, and transmitting the expiration time for the encrypted key to the smart device.

In some embodiments, the at least one encrypted key limitation may include one or more of a minimum wireless signal strength, at least one gesture performed with the smart device, depressing at least one button on the smart device one or more times, a biometric identifier associated with a user which can be measured by the smart device, and at least one gesture performed on a presence-sensitivity display of the smart device.

In some embodiments, the smart device may also include a charging circuit for the energy storage device. It is contemplated that the wireless transceiver in the smart device may include at least one of a NFC transceiver, a Bluetooth transceiver, a low-energy Bluetooth transceiver, a RFID transceiver, and an ABC.

In further embodiments, a system may include a RFID transceiver configured to transmit an unencrypted key in response to a designated interrogating radio signal. The system may also include a computing device configured to transmit, via a third RFID transceiver, the designated interrogating radio signal to any RFID-enabled devices within range. The computing device may also be configured to receive, via the third RFID transceiver, the unencrypted key in response to the designated interrogating radio signal. Further, the computing device may be configured to generate an encrypted key based on the unencrypted key. The computing device may be further configured to transmit the encrypted key to an encrypted key server. The system may also include an electronic door lock configured to obtain an encrypted key from the encrypted key server. The door lock may be configured to transmit, via a second RFID transceiver, the designated interrogating radio signal to any RFID-enabled devices within range. The door lock may also be configured to receive, via the second RFID transceiver, the unencrypted key in response to the designated interrogating radio signal. The door lock may be further configured to unlock in response to the unencrypted key when the unencrypted key corresponds to the encrypted key from the server.

In some embodiments, the designated interrogating radio signal in the system may power the first RFID transceiver. The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smartphones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Case

The following exemplary use case describes one example a typical user flow pattern. It is intended solely for explanatory purposes and not in limitation. In this example, the user has already made a reservation with a hotel and is traveling with her smartphone and a smart device (e.g., a smart card). From the user's perspective, it doesn't matter whether the smart device is active or passive. Either in advance of or upon arriving at the hotel, the user may check-in to the hotel via her smartphone (e.g., via a mobile application or a mobile web browser), thereby avoiding the line at the front desk. During the check-in process, the smartphone may provide a notification to the user that includes particulars of the hotel stay, including the hotel room number.

The smartphone and the smart card may pair and exchange information (either automatically or at the direction of the user via the smartphone during the check-in process). Alternatively, it is contemplated that the smartphone and the smart card may have previously paired and exchanged information ahead of the check-in process. Regardless of when the devices pair, the user may proceed directly to the designated hotel room, bypassing the hotel front desk. As the user (and the smart card) approaches the designated hotel room, a detection device (which may be disposed within or in communication with the electronic lock on the hotel door) may detect the presence of the smart card, and in response, request the key or an identifier from the smart card. Whether active (independently powered) or passive (powered by the system request), the smart card may provide the proper key and/or identifier to the system, which in turn directs the electronic lock to transition from a locked state to an unlocked state, and the user may proceed to open the hotel room door. Along the way, it is contemplated that the smart phone is configured to provide the user with notifications with status updates (e.g., smart card is authenticated, Room #1001 is now unlocked, etc.).

For convenience and ease of discussion, implementations of the disclosed technology are described above in connection with a financial or banking account associated with a user. It is to be understood that the disclosed implementations are not limited to financial service provider or banking accounts and are applicable to various other accounts associated with a user's sensitive information (e.g., utility/service accounts, medical information, and various other sensitive information).

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for automatically providing physical access to a restricted area associated with an entity, the method comprising:

receiving reservation data associated with a reservation request for access to a restricted area, the reservation data comprising first identification data associated with a smart transaction card associated with a financial account of a user, the smart transaction card being issued by a financial service provider that is different from the entity;

storing the reservation data on a data storage device;

receiving check-in data associated with a check-in request, the check-in request corresponding to the reservation request, wherein the check-in data comprises second identification data associated with the smart transaction card;

responsive to determining that the second identification data matches the first identification data, storing the reservation data as stored authentication data;

receiving detection data corresponding to a detection of the smart transaction card when the smart transaction card enters a predetermined location range associated with an electronic lock;

obtaining an identifier from the smart transaction card and via the electronic lock; and responsive to determining that the identifier matches the first identification data of the stored authentication data, directing the electronic lock to transition from a locked state to an unlocked state.

2. The method of claim 1, further comprising:
responsive to receiving the detection data, transmitting a request for the identifier from the smart transaction card.

3. The method of claim 1, further comprising:
responsive to receiving the detection data or responsive to obtaining the identifier from the smart transaction card, transmitting a request for secondary authentication data.

4. The method of claim 3, wherein the request for the secondary authentication data is transmitted to a computing device.

5. The method of claim 1, further comprising:
prior to directing the electronic lock to transition from a locked state to an unlocked state, determining whether the identifier was received during a time period in which the identifier is valid.

6. A system for authenticating a smart transaction card associated with a financial account of a user for unlocking an electronic lock associated with an entity, the system comprising:
one or more memory devices storing instructions; and
one or more processors configured to execute the instructions to:
receive detection data corresponding to a detection of the smart transaction card when the smart transaction card enters a predetermined location range associated with the electronic lock;
obtain, in response to the detection, an identifier from the smart transaction card;
obtain, within a predetermined time following the detection, secondary authentication data from a computing device associated with the smart transaction card; and
responsive to determining that (i) the identifier corresponds to stored identification data corresponding to previously received smart transaction card data and (ii) the secondary authentication data corresponds to stored secondary identification data, direct the electronic lock to transition from a locked state to an unlocked state, wherein the smart transaction card is issued by a financial service provider that is different from the entity.

7. The system of claim 6, wherein the one or more processors being configured to execute the instructions to obtain the identifier from the smart transaction card further comprises sending an identifier request to the smart transaction card, the identifier request providing power to a power collection circuit of the smart transaction card to enable to the smart transaction card to provide the identifier.

8. The system of claim 7, wherein the smart transaction card comprises one or more of a passive radio-frequency identification (RFID) tag or a passive smart tag.

9. The system of claim 8, wherein an external power supply comprises one or more of an RFID reader device and a smart tag reader device.

10. A system for authenticating a smart transaction card associated with a financial account of a user for unlocking an assigned electronic lock of a plurality of electronic locks associated with an entity, the system comprising:
one or more memory devices storing instructions; and
one or more processors configured to execute the instructions to:
receive a reservation request for access to a restricted area during a reservation time;
store the reservation request as stored reservation data;
obtain, from a computing device, check-in information for the user;
responsive to determining that the check-in information corresponds to the stored reservation data, store key data, the stored key data corresponding to an identifier associated with a smart transaction card associated with the user;
transmit, to the computing device, a lock identifier associated with the assigned electronic lock of the plurality of electronic locks;
receive, from the smart transaction card and via the assigned electronic lock, key data; and
responsive to determining that the key data corresponds to the stored key data, direct the assigned electronic lock to transition from a locked state to an unlocked state, wherein the smart transaction card is issued by a financial service provider that is different from the entity.

11. The system of claim 10, wherein the one or more processors is configured to execute the instructions to:
responsive to determining that the check-in information corresponds to the stored reservation data, transmit the key data to the smart transaction card.

12. The system of claim 10, wherein the one or more processors is configured to execute the instructions to:
responsive to determining that the check-in information corresponds to the stored reservation data, receive the key data from the smart transaction card.

13. The system of claim 10, wherein the one or more processors is configured to execute the instructions to:
generate an expiration time for the key data, the expiration time corresponding to the reservation request; and
prior to directing the assigned electronic lock to transition from the locked state to the unlocked state, determine that the expiration time has not expired.

14. The system of claim 10, wherein the one or more processors is configured to execute the instructions to:
generate at least one key limitation; and
transmit the at least one key limitation to the smart transaction card.

* * * * *